March 18, 1952     G. BORNEMAN     2,589,985
STOPCOCK RETAINING DEVICE
Filed Nov. 3, 1948
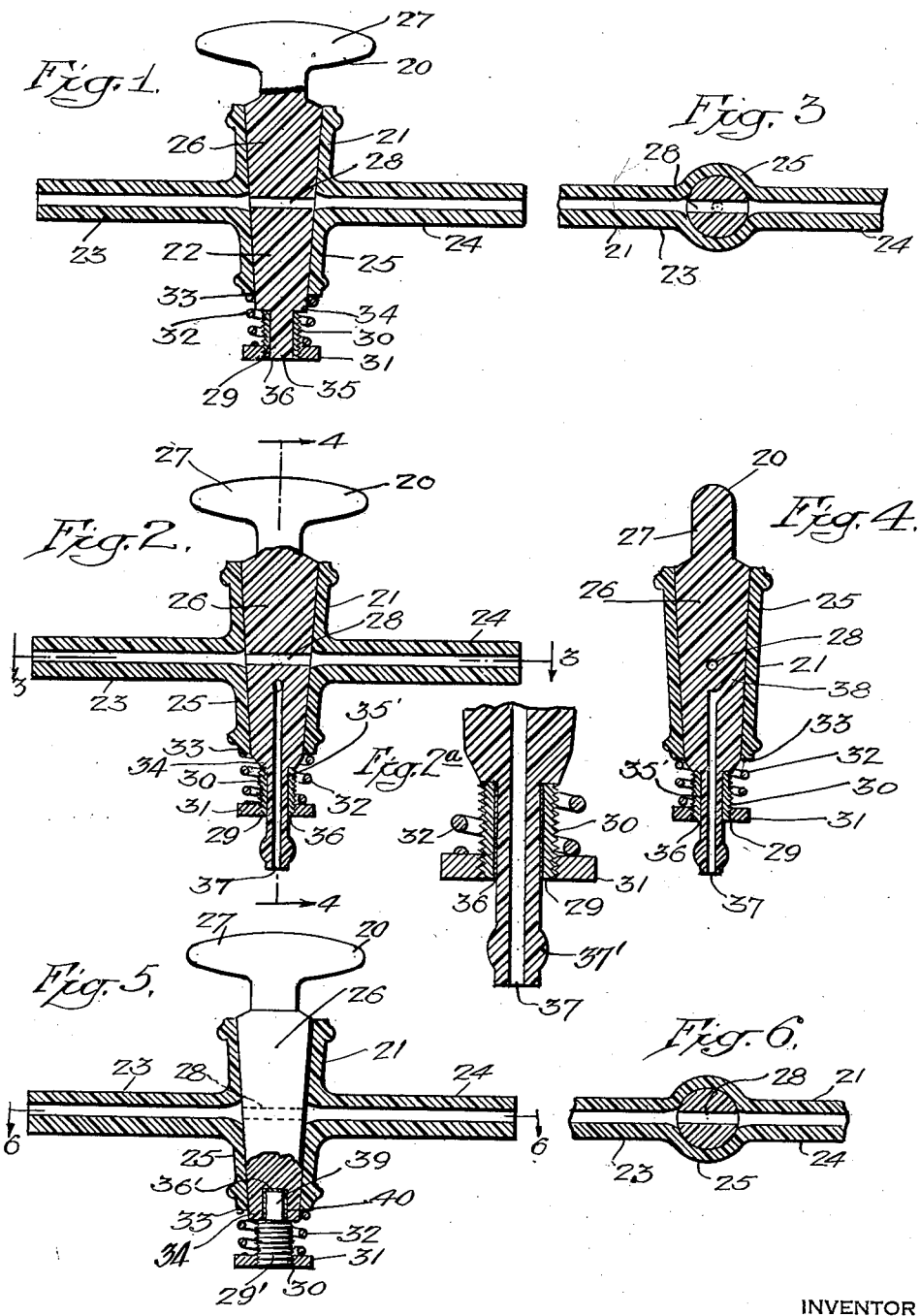
INVENTOR
George Borneman
BY
ATTORNEYS Patented Mar. 18, 1952

2,589,985

UNITED STATES PATENT OFFICE 2,589,985

STOPCOCK RETAINING DEVICE

George Borneman, Millville, N. J., assignor to L. G. Nester Company, Incorporated, Millville, N. J., a corporation of New Jersey Application November 3, 1948, Serial No. 58,048

1 Claim. (Cl. 251—112)

The present invention relates to improvements in stop cocks of the type employed in chemical apparatus and usually produced from glass.

A purpose of the invention is to secure the plug in the socket of a stop cock by a spring which is detachably fastened to the cock and which can be removed from the cock very quickly and with the manipulation of a minimum of separate parts.

A further purpose is to guide the inner end of the spring by slightly extending the plug body beyond the socket.

A further purpose is to employ a hollow threaded stem united by cement to the plug.

A further purpose is to extend an axial connection on the stop cock through the stem.

A further purpose is to employ a stem of stud form secured in a recess on the plug.

Further purposes appear in the specification and in the claim.

In the drawings I have chosen to illustrate a few only of the numerous embodiments in which my invention may appear, choosing the forms shown from the standpoints of convenience in illustration, satisfactory operation and clear demonstration of the principles involved.

Figure 1 is a longitudinal section of the stop cock taken axially through the plug and axially through the tubular connection to the socket, a portion of the handle being shown in elevation.

Figures 2 to 4 inclusive illustrate a variation.

Figure 2 is a view corresponding to Figure 1 showing a stop cock provided with a tail extending axially of the plug.

Figure 2ª is an enlarged fragment of Figure 2.

Figure 3 is a fragmentary section of Figure 2 on the line 3—3.

Figure 4 is a section of Figure 2 on the line 4—4.

Figure 5 and 6 illustrate a further variation.

Figure 5 is a view corresponding to Figure 1, showing the variation.

Figure 6 is a fragmentary section of Figure 5 on the line 6—6.

Describing in illustration but not in limitation and referring to the drawings:

Glass stop cocks of the type which are commonly employed in chemical apparatus are individually ground and lapped. It is desirable to keep the parts together and avoid mixing the plugs of various cocks.

For functioning of stop cocks in service, it is desirable that the plug be prevented from withdrawing from the socket. Various crude devices employing rubber bands and the like have been used to hold the plug in position.

The present invention is designed to assure that the parts of the stop cock cannot become separated unintentionally. At the same time provision is made for regulating the pressure, so that the user can employ a very thin film of grease or other lubricant or sealing material, combined with any desired pressure over a wide range, to secure proper functioning. At the same time the parts can be separated very readily for washing or the like, and a minimum of loose components is provided at disassembly, so that the danger of loss of parts is avoided, and the necessity of performing a tedious job at reassembly is eliminated.

As shown in Figure 1, the stop cock 20 of the invention comprises a socket 21 and a plug 22.

In all of the forms, the socket 21 will desirably be in every respect standard, consisting of opposite aligned tubular connections 23 and 24, normally of glass tubing, welded into a tapered socket body 25, and having through bores to the interior of the socket body.

The plug 22 has the usual features of a stop cock plug, including a tapered plug body 26 which fits into and cooperates with the tapered interior of the socket, and a handle 27 desirably integral with the body. The body has a transverse port 28 which in one position (the open position) communicates through from one tubular connection 23 to the other tubular connection 24. It will be understood that the invention can be appled to stop cocks having any desired number of cross ports, connected or not connected to one another.

At the small end of the plug body, a stem 29 is mounted. The stem is externally threaded at 30 and makes threaded connection with a nut 31 which is adjustable along the thread. A spiral spring 32 surrounds the stem, and abuts the socket at one end of the spring, while the other end of the spring abuts the nut 31. To assure that the spring will remain properly centered, it is desirably of tapered or conical form, as shown.

To act as an aligning member to keep the spring in position against the end of the socket, the plug is extended as shown at 34 to a position inside the spring, thus keeping the spring from losing its central alignment and improperly abutting the end of the plug.

The manner of securing the stem to the plug varies in various forms. In Figure 1 a rod-like glass projection 35 integral with the plug is carried from the center of the small end of the plug longitudinally inside the stem. The stem is then united to the portion 35 of the plug by cement 36, best seen in Figure 2ª, which forms a suitably thin layer between the glass and the metal of the stem. Any suitable cement may be used, the preferred cement being litharge mixed with glycerine, as well known. Other suitable cements such as rubber cement and casein adhesive may be used.

The invention finds its application also in cocks which are intended to have an axial discharge port 37 as shown in Figures 2 to 4. In this case a diagonal passage 38 is drilled through the plug in position to align with either of the tubular connections 23 or 24. The passage 38 connects with the axial port 37 which is extended through the portion 35' which is within the stem and carries a fitting 37' at the lower end for connection to a rubber hose or the like. If the fitting 37' is to be formed complete before the stem is put in place, the interior bore of the stem must be larger than the fitting, but if the fitting 37' is to be formed after the stem is slipped over the portion 35', the fitting can be larger than the hole through the stem.

The device of Figures 2 to 4 has essentially the same manner of attaching the stem as that shown in Figure 1. In some cases it may be preferable to use a stem which is a solid like a stud rather than being tubular. A construction of this character is shown in Figures 5 and 6. The stud 29', suitably of metal, is threaded at 30 in the same manner as the stem 29. The stud has a head 39 which extends into a tubular recess 40 in the bottom of the plug and is held therein by a layer of cement 36' (of the character set forth above), but otherwise the construction of Figures 5 and 6 is the same as the other forms, and the lower end of the plug is extended beyond the socket to guide the spring as in the other form.

The stud construction of Figures 5 and 6 is not well suited to application to a cock having a central axial discharge port through the plug as shown in Figures 2 to 4.

In operation it will be seen that the cock can readily be disassembled for cleaning or lubricating by removing the nut and spring. The plug can then be pulled out of the socket. The reverse procedure can be used for reassembly.

After the cock is assembled, the pressure can readily be adjusted by tightening or loosening the nut. If a radical departure in pressure is desired the spring may be replaced by a stronger or weaker spring.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a stop cock, a tapering glass cock socket having tubular connections thereto, a tapering glass cock plug which has a handle and a bore in one position communicating with the tubular connections, and which fits in the socket and extends therefrom at the tapered portion opposite to the handle, a threaded stem cemented to the plug and extending axially therefrom beyond the tapered portion, a spring surrounding the stem, engaging the socket at one end of the spring and guided internally by the end of the taper of the plug, and a nut on the stem beyond the spring engaging the other end of the spring.

GEORGE BORNEMAN.

REFERENCES CITED

The following references are of record in the file of this patent:

UNITED STATES PATENTS

| Number | Name | Date |
|---|---|---|
| 288,781 | Duerstock | Nov. 20, 1883 |
| 322,318 | Polle | July 14, 1885 |
| 916,954 | Murch | Mar. 30, 1909 |
| 1,797,855 | Conlon | Mar. 24, 1931 |
| 1,896,208 | Jones | Feb. 7, 1933 |
| 2,412,597 | Brewer | Dec. 17, 1946 |
| 2,429,897 | Saunders et al. | Oct. 28, 1947 |